Feb. 6, 1940.  L. A. KLINE  2,189,666
DEPOLARIZATION OF PRIMARY CELLS
Filed Oct. 2, 1937
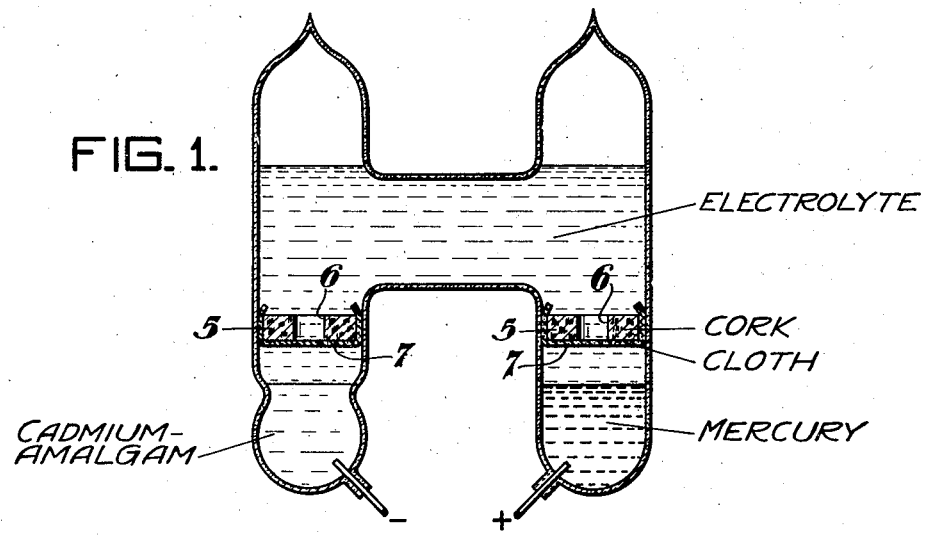
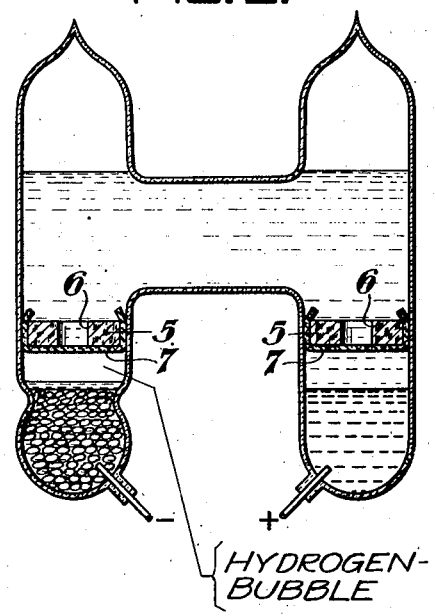
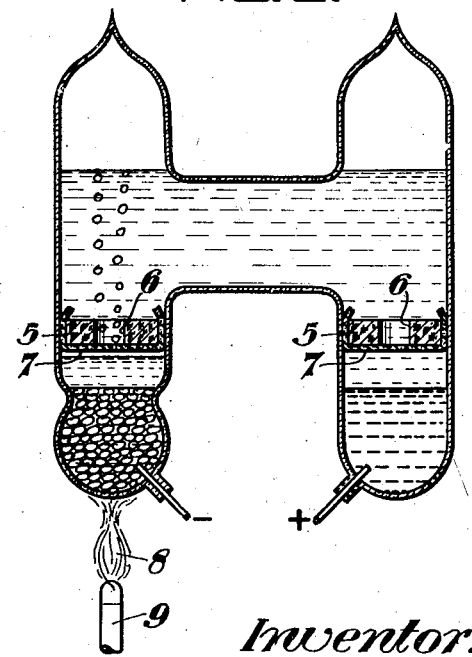
Inventor:
LEE A. KLINE,
by: Usina & Lauber
his Attorneys.

Patented Feb. 6, 1940

2,189,666

UNITED STATES PATENT OFFICE 2,189,666

DEPOLARIZATION OF PRIMARY CELLS

Lee A. Kline, Niles, Ohio

Application October 2, 1937, Serial No. 167,076

3 Claims. (Cl. 136—164)

The invention relates to standard primary cells and, more particularly, to a means for depolarizing such cells.

In primary cells, such as the Weston type, it is generally common for the positive pole or mercury electrode to become polarized and in certain instances it has been found that the negative pole or amalgam electrode also becomes polarized particularly if the cell is inadvertently overheated as it oftentimes is as when used in conjunction with open hearth furnace pyrometers. Also, an improper application of external voltage or a closed circuit maintained for some time will cause the same condition, that is, polarization of the negative pole or the amalgam electrode. The present invention relates to this abnormal polarizing of the negative pole of such cells and to a method of depolarizing or restoring the same.

Accordingly, it is the object of this invention to provide a means for depolarizing primary cells and rejuvenating them for indefinite use.

Various other aspects and advantages of my invention will more fully appear during the course of the following specification and in the accompanying drawing, and will be particularly pointed out in the apended claims.

In the drawing:

Figure 1 is a vertical section through a typical Weston type standard cell;

Figure 2 is a view similar to Figure 1 showing the formation of a hydrogen bubble therein; and, Figure 3 is a sectional view similar to Figure 2, of a Weston type standard cell shown in connection with my invention.

There is shown in the drawing a typical primary standard cell of the Weston type which is very commonly used. For the purpose of illustration, the particular cell shown comprises an H-tube having a mixture of mercurous and cadmium sulphate as the electrolyte, mercury in the bottom of one leg to form the positive pole or anode, and cadmium amalgam in the bottom of the other leg thereof to form the negative pole or cathode. There is preferably provided a cork 5 having a hole 6 therein and a cloth or suitable filter 7 thereover which is adapted to keep the materials forming the cathode and the anode in place in the bottom of their respective legs or compartments of the tube.

When in service hydrogen gas is sometimes liberated at the negative pole and tends to collect under the cork and cloth, gradually forcing the electrolyte upwardly in the leg and separating the electrolyte from the material of the negative pole, as shown in Figure 2, thus breaking or blanketing contact therebetween and polarizing the cell.

According to the present invention, the cell can be depolarized and rejuvenated by alternately heating and cooling the negative pole, as shown in Figure 3. The heat tends to cause the hydrogen gas to expand and be liberated in the form of bubbles which pass up through the cork and cloth and out through the electrolyte.

This pole can be heated by any suitable means, such as by the flame 8 of a gas burner 9. After the pole is properly heated and a small portion of the hydrogen gas liberated, the cell is allowed to cool in order to allow a portion of the electrolyte to pass downwardly through the cloth to replace the hydrogen that has been liberated. This alternate heating and cooling is, of course, repeated until all of the hydrogen is driven off and contact again established between the negative pole and the electrolyte. Extreme care should be exercised so as to not heat the leg of the tube above the safe maximum temperature of the cell which is usually 140 degrees Fahrenheit. It has been found that satisfactory results can be obtained by heating it to about 120 degrees Fahrenheit.

As a result of my invention, it will be seen that I have provided a simple and inexpensive means of depolarizing primary cells which rejuvenates them to their original capacity.

While I have shown and described a specific embodiment of the present invention, it will be understood that I do not wish to be limited exactly thereto since various modifications may be made without departing from the scope of the invention, as defined by the following claims.

I claim:

1. In a primary cell of the Weston type consisting an H-tube having a mixture of mercurous sulphate and cadmium sulphate as the electrolyte, mercury as the positive electrode, cadmium amalgam as the negative electrode, a cork disk securely positioned in each of the legs of said H-tube above the electrode solutions therein to retain said solutions in their respective legs, said cork disk having an opening therein with a filter cloth stretched thereover, the method of depolarizing and rejuvenating the cell which comprises alternately heating and cooling the negative electrode so as to cause the hydrogen gas liberated at said electrode to expand and pass upwardly through the cloth and cork disk and through the electrolyte, thereby permitting the electrolyte to pass downwardly through the cork and cloth into contact with the negative electrode.

2. In a primary cell of the Weston type consisting of an H-tube having a mixture of mercurous sulphate and cadmium sulphate as the electrolyte, mercury as the positive electrode, cadmium amalgam as the negative electrode, a cork disk securely positioned in each of the legs of said H-tube above the electrode solutions therein to retain said solutions in their respective legs, said cork disk having an opening therein with a filter cloth stretched thereover, the method of depolarizing and rejuvenating the cell which comprises heating the negative electrode to a temperature of approximately 120 degrees Fahrenheit so as to cause the hydrogen liberated at said pole to expand and be driven upwardly through the cloth and cork and out through the electrolyte, cooling said negative electrode so that a portion of the electrolyte will pass downwardly through the cork and cloth to replace the hydrogen driven off, and repeating these steps until all of the hydrogen is driven from said electrode and contact is again established between the negative electrode and the electrolyte.

3. In a primary cell of the Weston type consisting an H-tube having a mixture of mercurous sulphate and cadmium sulphate as the electrolyte, mercury positioned in one leg thereof, cadmium amalgam positioned in the other leg thereof and means for retaining at least the cadmium amalgam in its respective leg, the method of depolarizing and rejuvenating the cell which comprises heating the leg containing the cadmium amalgam to such a temperature as to cause the hydrogen that has collected therearound to expand and be driven upwardly through the retaining means therein and out through the electrolyte, cooling said leg so that a portion of the electrolyte will pass downwardly in the leg through the retaining means to replace the hydrogen driven from the space immediately above the cadmium amalgam positioned therein and alternately heating and cooling the leg until all of the hydrogen is driven therefrom and contact has again been established between the cadmium amalgam and the electrolyte.

LEE A. KLINE.